C. H. CONGDON.
CHART DISPLAY APPARATUS.
APPLICATION FILED JAN. 11, 1906.
1,014,640.
Patented Jan. 16, 1912.
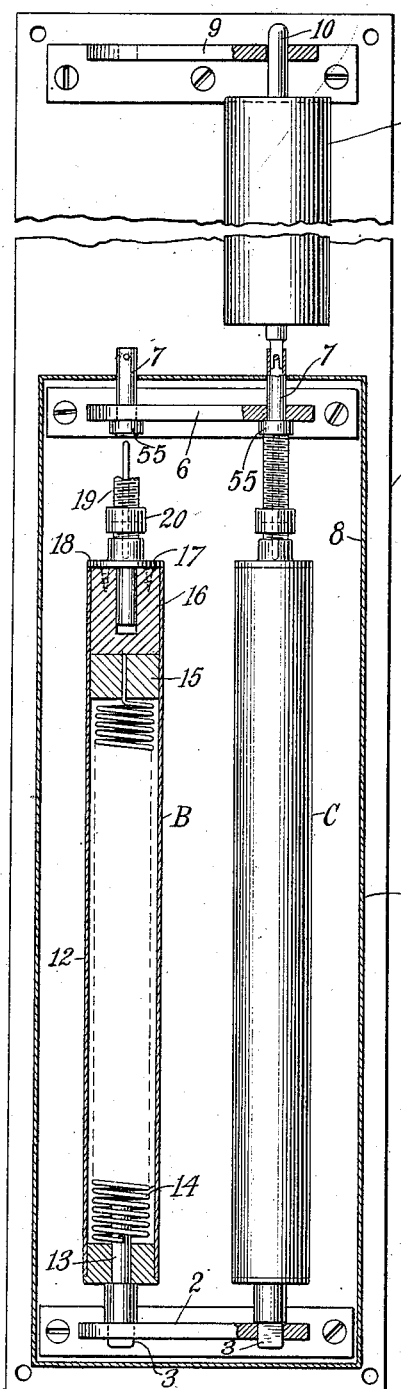
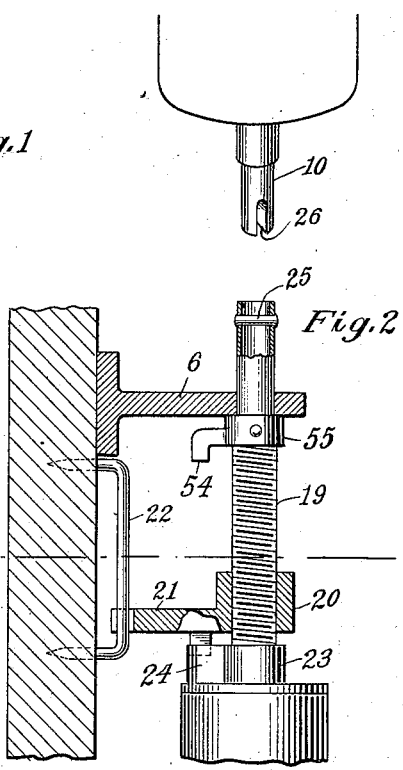
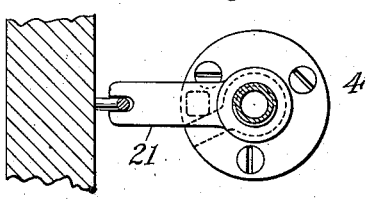
Witnesses
Raphael Netter.
Frank W Peeke.
Charles H Congdon Inventor
By his Attorney

UNITED STATES PATENT OFFICE.

CHARLES H. CONGDON, OF MARSHALLS CREEK, PENNSYLVANIA.

CHART-DISPLAY APPARATUS.

1,014,640. Specification of Letters Patent. Patented Jan. 16, 1912.

Application filed January 11, 1906. Serial No. 295,550.

*To all whom it may concern:*

Be it known that I, CHARLES H. CONGDON, a citizen of the United States, residing at and whose post-office address is Marshalls Creek, Monroe county, Pennsylvania, have invented new and useful Improvements in Chart-Display Apparatus, of which the following is a specification.

My invention relates to improvements in chart or map holders, its object being to provide a simple automatically acting device to which the chart or map may be connected and by which it may be supported while being unwound for display or educational work.

To this end, my invention consists in the features of construction hereinafter described and claimed.

In the accompanying drawings forming part of this specification, Figure 1 is an elevation, partly broken and partly in section, of my improved apparatus, showing the tension or winding devices and chart roller; Fig. 2 is a detail of the stop mechanism for limiting the winding and unwinding movement of the spring roller to which the chart roller is attached; Fig. 3 is a cross-sectional view of Fig. 2 taken on the dot and dash line; Fig. 4 is a detail of the end of the chart roller showing its means of detachable connection with the spring roller.

For class instruction in the school room by means of mechanical charts, maps or other wall lessons, it is essential that such chart or other article be quickly set in place and extended along the wall and as quickly detached and put away and another substituted for it. It is further important that the chart be at all times under tension, which when the chart is extended will hold it in proper position. It is also desirable that such wall lessons be imprinted on both sides of the chart for economy in material, and in such case the winding apparatus must be adapted for opposite winding or rolling of the chart. For this purpose, I mount the chart upon a drum or roller of the ordinary type having gudgeons at each end, said gudgeons being provided with means for engaging the spring tension device and turning the same when the roller is actuated by the unrolling of the chart. The tension device is similar to a tension spring shade roller of well known type, with the shaft of the rotating part of which the gudgeon of the chart roller may be engaged. Interposed between the relatively rotative and fixed members of the tension device is provided an attachment traveling upon a screw carried by one of said parts and engaging with the other part, the screw carrying part being provided with a stop adapted to be engaged by said attachment to limit its travel upon said screw and fix the limit of relaxing or minimum tension of the spring.

In the drawings A represents a suitable frame or support adapted to be fixed permanently to the wall of the room in the position illustrated in Fig. 1. This frame is provided with fittings 2 at the bottom to receive the angular ends of the spring rollers B and C, and at the upper end with a bearing or journal fitting 6 to receive journals 7 of the roller shafts. These described parts are inclosed and protected by means of a case or cover 8. At the top of the frame A is provided another journal bracket 9 to receive the gudgeon 10 of the roller 11.

In the preferred construction illustrated in Figs. 1, 2, 3 and 4, the spring roller B is of the ordinary Hartshorn shade roller type, made up of a hollow cylinder 12, journaled at its lower end on the non-rotating stud 13, and containing a tension spiral spring 14, one end of which is fixed to the stud 13, and the other to the plug 15, fixed in the upper end of the cylinder. In this plug 15, or if preferred, in another similar plug 16, superimposed thereon, is inserted the gudgeon or journal shaft 7, preferably secured therein as by means of screws 17 passing through the cap 18 and entering the plug 16. The gudgeons 7 have a screw threaded portion 19, intermediate of the roller and the journal tip. Upon this screw threaded portion runs a nut 20, having a bifurcated arm 21 (see Figs. 2 and 3), which engages a guide rod 22, preferably in the form of a long wire staple driven into the back of the case A. It will thus be seen that the rotative movement of the upper end of the roller B will cause the nut to travel along the threaded portion 19. The hub 23 of the gudgeon is provided with a lug or shoulder 24, which is engaged by the nut 20 in its travel toward the roller upon the screw and serves to stop the rotative movement between the screw and nut, and hence to limit the rotative movement of the roller B and the unwinding or relaxing of its spring beyond the predetermined minimum limit for the purpose hereinafter described. Similarly, the rotative movement of the roller is limited in the opposite direction by the impact of the nut 20, upon the spur 54 on the collar 55, fixed to the screw 19. The importance of these safety devices will be hereinafter shown. The journal tip of the gudgeon 7 is preferably a cylinder with a diametric pin 25 fixed therein, to receive and be engaged by the gudgeon 10 and the chart roller 11, the end of which is provided with a diametric slot 26 which receives the pin 25 when the gudgeon 10 is inserted into the gudgeon 7, as illustrated in Fig. 1.

As for economical reasons these charts are preferably imprinted with musical scores or other eductional matter on both sides, it is necessary that oppositely winding tension devices be provided for displaying the opposite sides. In the preferred construction of Fig. 1 this is secured by means of a tension roll C having a spiral spring oppositely wound to that of roll B, which construction being obvious is not shown. The chart roller is therefore fitted to either one of the rollers B and C, according to the direction of winding and unwinding movement determined by the side of the chart which is to be displayed.

The manner of using the device is obvious from the foregoing description and the drawings. The teacher selects a chart and slips it into place upon that one of the fittings adapted to the direction in which the roller turns as the chart is unwound. The free end of the chart is then drawn out and attached to the hooks 50, the tension of the spring of the roller B or C with which the chart is connected holding it extended and flat against the wall. After the chart has been used, it is detached from the hooks 50 and rewound upon its roller under the tension of the connected spring, the stop mechanism above described preventing the further turning of the parts after the chart has been fully wound, and holding the spring under initial or minimum tension, the parts being so adjusted that the chart is always under sufficient tension to hold it in proper position. When the opposite side of the chart is to be used its roller is fitted to the other tension device, the operation being identically the same.

I claim:

1. In a chart display apparatus, in combination, a screw threaded shaft, a tension device connected to one end thereof for operating the same, a coupling upon the other end of the shaft for detachably connecting a chart carrying roll thereto, a nut threaded on said shaft, relatively fixed means for preventing rotation of said nut, and a stop limiting the travel of said nut on said shaft.

2. In a chart display apparatus, in combination, a reversible chart, a roll for carrying same, a pair of driving shafts to either of which said chart carrying roll can be detachably connected so as to be driven thereby, said shafts having spring actuating means for operating them in opposite directions, and means upon said shafts for limiting their rotative movement.

Witness my hand at the city of New York this 30th day of December, 1905.

CHARLES H. CONGDON

In presence of—
HENRY W. CLARK,
T. D. M⸺